US006244491B1

(12) United States Patent
Kandasamy et al.

(10) Patent No.: US 6,244,491 B1
(45) **Date of Patent: *Jun. 12, 2001**

(54) HAND HELD STAPLER

(75) Inventors: Balaji Kandasamy, Naperville; Scott Kouri, Chicago; Sumir Kapur, Oak Park; Stephen D. Berry, Plainfield, all of IL (US)

(73) Assignee: ACCO Brands, Inc., Lincolnshire, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/396,399

(22) Filed: Sep. 15, 1999

Related U.S. Application Data

(63) Continuation-in-part of application No. 08/917,764, filed on Aug. 27, 1997, now abandoned.

(51) Int. Cl.[7] .......... B23C 5/02

(52) U.S. Cl. .......... 227/134; 227/120

(58) Field of Search .......... 227/134, 120, 227/156, 132

(56) References Cited

U.S. PATENT DOCUMENTS

| | | | | |
|---|---|---|---|---|
| D. 214,347 | | 6/1969 | Power | D8/50 |
| D. 355,822 | | 2/1995 | Smith | D8/50 |
| D. 361,486 | | 8/1995 | Yang | D8/50 |
| D. 367,414 | | 2/1996 | Chi | D8/50 |
| D. 401,825 | | 12/1998 | Parsey et al. | D8/50 |
| 2,037,334 | | 4/1936 | Maynard | 1/3 |
| 2,272,773 | * | 2/1942 | Maynard | 227/134 |
| 2,304,293 | * | 12/1942 | Wille | 227/134 |
| 3,144,653 | * | 8/1964 | Kohen | 227/134 |
| 3,630,428 | * | 12/1971 | Olney et al. | 227/134 |
| 4,315,589 | | 2/1982 | Soong | 227/155 |
| 4,925,082 | | 5/1990 | Kim | 227/120 |
| 5,492,261 | * | 2/1996 | Chi | 227/134 |
| 5,692,667 | * | 12/1997 | Chi | 227/134 |
| 5,758,813 | * | 6/1998 | Kikuchi et al. | 227/134 |

FOREIGN PATENT DOCUMENTS

| | | | |
|---|---|---|---|
| 2229129 | 9/1990 | (GB) | 227/134 |

* cited by examiner

*Primary Examiner*—Scott A. Smith
(74) *Attorney, Agent, or Firm*—Pennie & Edmonds LLP

(57) ABSTRACT

The present invention discloses a hand held stapler which can be used for joining sets of different numbers of paper sheets. The stapler has a stapling arm with a lever which extend past a pivot position by a length greater than the magazine of the stapler by an amount sufficient to provide a substantially increased leverage for driving staples during the stapling operation.

9 Claims, 3 Drawing Sheets

HAND HELD STAPLER

This is a continuation-in-part of Application No. 08/917,764, which was filed on Aug. 27, 1997, now abandoned.

FIELD OF THE INVENTION

This present invention relates to a device for joining together sheets of paper by stapling. More particularly, this device is a hand held stapling apparatus for efficiently joining together different quantities of paper sheets.

BACKGROUND OF THE INVENTION

Staplers are an indispensable part of office appliances for fastening papers or documents. Conventionally, depending on the thickness of a set of paper sheets, an operator chooses different commercially available stapling machines and/or sizes of staples to accommodate the need. For example, a heavy duty stapler with long leg staples is used for attaching a relatively large number of sheets of paper, and a hand held desk stapler equipped with short leg staples is utilized for a relatively small number of sheets of paper. Hence, the operator must purchase and maintain at least two kinds of staplers in his office for these different uses. This is neither convenient, nor economical, particularly for a company that has a large number of personnel.

In an attempt to remedy this problem, the prior art provides a single stapler loaded with standard size staples having relatively long legs in order to try to join sets of paper sheets having different thicknesses. Although this compromise may prove to be economically successful, it does not produce the desired stapling quality. When such a stapler is used to produce a set containing only two or three sheets of paper, the staple re-penetrates through the paper sheets during the stapling operation. Because of the relatively long legs of the staples, the staple legs protrude outwardly from the top sheet of the set. The stapling operation not only yields a very unsightly stapled set, but the exposed legs can puncture the operator's fingers when stapled documents are handled. On the other hand, when a set of a large number of sheets of paper are to be stapled, the staple can collapse at its bridge portion to form a "M" shape during the stapling operation due to the increased resistance generated from the thicker set of paper sheets.

In the prior art, U.S. Pat. 4,315,589 issued to Soong discloses a stapling apparatus which improves stapling capability in handling thin sets of sheets, say on the order of two or three sheets, as well as thick sets, on the order of 20 or more sheets. To achieve its objective, the stapling apparatus uses an anvil to bend the staples during the driving operation by the driver member. The anvil is formed with a depression or opening between the staple clinching grooves and is of a size which includes the adjacent ends of the grooves. The clinching grooves have their longitudinal axes parallel but at an angle relative to the bridge portion of the staple to prevent the legs of the staple from interfering with each other during the stapling operation. The depression or opening between the clinching grooves assists in controlling operation to prevent re-entry or re-penetration of the legs through the top sheet when a stack of sheets is being stapled.

Although the stapling apparatus of this patent can improve the stapling quality for a thin set of paper sheets, it is still unable to be used as a hand held device for stapling a thick set of paper sheets, such as, e.g., 50–60 sheets. This is because the device does not provide sufficient leverage for proper penetration of the sheets. Also, the staple can collapse during stapling of a thick set of sheets.

Moreover, there is no commercially available hand held heavy duty stapler which is capable of stapling a set of paper from 2 to 60 sheets. In the prior art, a table top heavy duty stapler is used to staple a thick set of paper sheets. An operator uses one hand to grasp a driving arm to press it down and effect the stapling operation. In other words, prior art heavy duty staplers are not hand held and are not operated unless the stapler is placed on a table or other flat support surface so that the used can apply sufficient leverage to the handle to penetrate the sheets with the staple. Otherwise, it is difficult, if not impossible, for a user to grasp the stapler and operate it like a personal stapler adapted for joining thin sets of paper sheets.

Thus, there remains a need for a single device that can successfully staple various sets of paper sheets ranging from only a few sheets to as many as 50 or 60. Furthermore, it would be advantageous for such a device to be operable as a convenient, hand held device. The present invention provides one such device.

SUMMARY OF THE INVENTION

The invention is directed to a hand-held stapler that includes a base, a magazine, and a stapling arm which are pivoted to each other at a pivot position. The base and the stapling arm have forward ends which are positioned at lengths from the pivot position, but are substantially longer than the length from the pivot position to a stapled dispensing passage area of the magazine. The difference in lengths substantially increases the leverage for driving the staples during stapling. However, the lever is coupled to a pivoted portion of the stapling arm such that the lever also pivots directly about the pivoted position. Also, preferably the lever and base are mounted at an angle less than about 20° and sufficiently close to each other to enable the stapler to be operated while hand-held by an operator adjacent the forward ends of the base and lever. This arrangement facilitates the stapling of stacks of many papers, preferably of about 60 sheets.

To accomplish these objectives, the present invention relates to a hand held heavy duty stapler that includes a base having forward and rearward ends and a staple leg clinching anvil positioned thereon; a magazine comprising an elongated channel for containing therein a band of staples each having a pair of legs connected by a bridge portion, the channel having a bottom wall, a pair of sidewalls, a front vertical wall, and a passageway in the bottom wall adjacent the front vertical wall to allow dispensing of the staples, and a stapling arm pivotally mounted about the pivot position at the rearward end of the base for driving the magazine toward the base during the stapling operation. The magazine is pivotally mounted about a pivot position at the rearward end of the base so that the magazine and base can move toward each other during a stapling operation, and the stapling arm includes a driver blade for sequentially dispensing individual staples through the passageway from the band of staples contained in the magazine.

One embodiment of the invention relates to a support spring positioned in the channel of the magazine and having a top surface underlying the band of staples prior to dispensing, and a front surface operatively associated with the front vertical wall of the magazine for supporting the bridge portion of each staple as it is being dispensed from the magazine. This support spring permits the staple to be dispensed toward and against the anvil while preventing the collapse of the staple bridge during the stapling operation.

The front member of the support spring may be sloped and may be in resilient spring contact the front vertical wall of the magazine. Then, the front member of the support spring can be moved away from the front vertical wall of the magazine by movement of the driver blade and the staple bridge downwardly toward the passageway. Also, the top surface of the support spring can be spaced from the front vertical wall of the magazine by a distance slightly greater than the thickness of an individual staple to be dispensed through said staple dispensing passageway. Advantageously, the support spring further comprises a rear member extending away from the upper member for mounting on the bottom wall of the magazine.

The stapler can include a spacer attached to the bottom wall of the magazine adjacent to and at a location below the staple dispensing passageway to compensate for some of the angular movement of the magazine relative to the base as the magazine is moved toward the base and to assist in supporting the staple as it exits the passageway. The spacer is preferably spaced from the front vertical wall of the magazine by a distance slightly greater than the thickness of an individual staple to be dispensed. This assures correct placement of the staple in the sheets to be joined.

Yet another embodiment of the invention relates to a stapling arm having front and rear ends with the rear end including a pair of spaced rings for pivotally mounting the stapling arm about the pivot position at the rearward end of the base, with each ring including a recess. The stapling arm includes a driver blade for sequentially dispensing individual staples from the magazine through the passageway. A pusher member is provided for urging the band of staples toward the front vertical wall of the magazine. The pusher member has a front, U-shaped staple band pushing portion and a rear portion having a top connected between a pair of sidewalls, and a wing extending essentially perpendicularly from each sidewall. When the stapling arm is placed in an open position where it aligns with the magazine, the wings of the pusher member engage the recesses of the rings of the end members of the stapling arm to lock the stapling arm and magazine in the open position. In this embodiment, it is advantageous to also include a support spring and spacer as defined above.

A preferred clinching anvil is also disclosed herein. This anvil includes a pair of grooves which face in opposite directions and which are arranged adjacent each other, with each groove having opposite first and second ends and being configured and dimensioned to have a cross-section that defines a steep slope at a first end of the groove followed by a shallow slope at the second end of the groove. The steep slope of each groove is aligned with the passageway for initial engagement by the legs of the staple being dispensed therethrough. As each staple leg enters a groove, it is initially bent by the steeply sloped portion toward the other leg and then is bent by the flat bottom portion in a direction that is essentially parallel to the other leg to thus allow the stapler to join either a relatively large number or relatively small of sheets to be stapled without causing the staple to repenetrate the sheets.

In this embodiment, the anvil has a relatively flat upper surface, and each groove is positioned at an angle with respect to the angle of the driver blade and the staple bridges to assist in placing the staple in the sheets. Also, each groove of the anvil is further configured and dimensioned to include a gradually sloped portion which extends away from the flat bottom portion to the second end of the groove to allow the stapler to join sets of paper sheets containing from two to sixty sheets with essentially the same stapling finishing. The steep slope at the first end of the groove has an angle of about 45° and the shallow slope at the second end of the groove has an angle of about 5°, with these angles calculated relative to the flat upper surface of the anvil.

BRIEF DESCRIPTION OF THE DRAWINGS

These and other objects, features and elements of the present invention will be better understood from the following detailed description of the preferred embodiments of the invention in which.

DETAILED DESCRIPTION OF PREFERRED EMBODIMENTS

The stapling apparatus or stapler of the present invention is a hand held, relatively compact device that can join sets of paper sheets containing preferably from two to sixty sheets with the same stapling finishing. The apparatus can drive a staple through these numbers of sheets without deforming the staple bridge, a typical problem encountered when a large number of sheets are to be joined, and without bending the staple legs to the degree that they re-penetrate the top sheet of the set of paper sheets, a typical problem for heavy duty staplers that are used to join a small number of sheets. These enhancements in stapling performance and finishing are achieved through the combination of the following components and features in the stapler.

Figure 1:
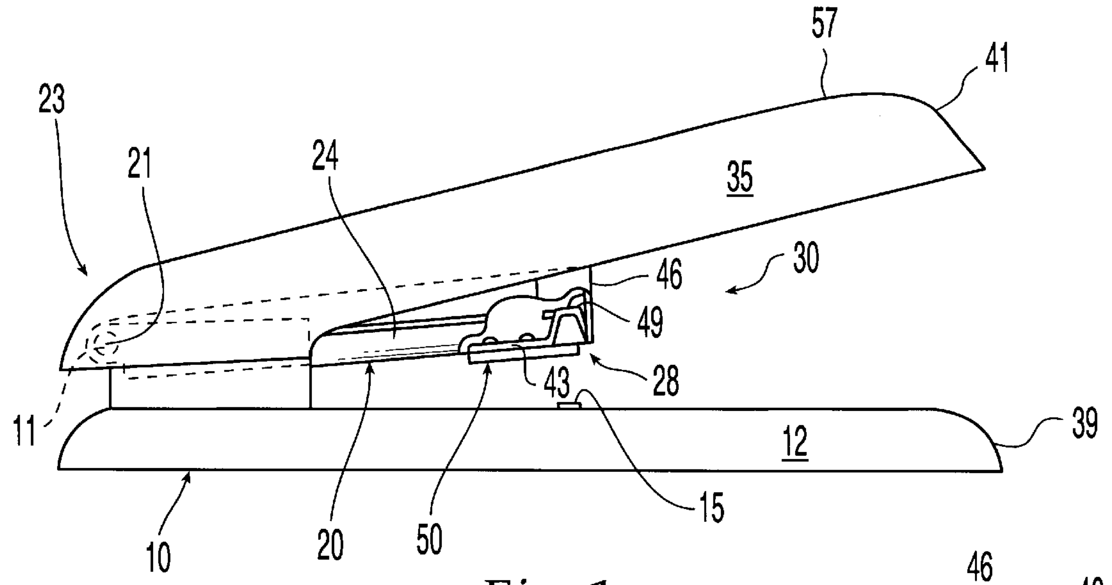
FIG. 1 is a side elevational view of a stapler according to the invention.

FIG. 1 depicts the stapler at rest or in a ready to use position. The stapler basically includes a relatively flat, rectangular base 10 having a staple leg clinching anvil thereon, a staple magazine 20 positioned above the base and operatively associated therewith via a pivotable connection at a pivot position 21, preferably near the rearward end 23 of the base 22, and a stapling arm 30 associated with a lever 35, which is also pivotable at the same position 21 as the magazine 20 at the rearward end 23 of the base 10. To achieve this pivotable movement, the stapling arm 30 and the magazine 20 are conventionally mounted to the base 10 by a pair of internal pivot pins 11 with the stapling arm 30 mounted at the outermost position of each pin 11. These pivot pins 11 also serve to pivot the magazine 20 relative to the stapling arm 30.

The magazine 20 is in the form of a channel having a base 22, upstanding side walls 24 and a front vertical wall 26 at its forward end which limits the removal of staples from the magazine 20 when contained therein. At this forward end of the magazine, a staple dispensing passageway 28 is formed as an open guideway for the egress of individual staples when driven out of the stapler.

The staples are sequentially driven out of the device from the supply of staples in the magazine 20 by a driver blade 60 which is associated with the stapling arm 30. Force is applied to the lever 35, with the base 10 either placed upon a flat support surface, such as a desk top or table top, or by the user grasping the stapler by the lever 35 and front end 39 of the base 12. The base can include a foam or other soft support surface for contacting the table or desk top. As with conventional staplers, the sheets of paper to be joined into a set are placed between the passageway 28 of the magazine 20 and the anvil 15 before force is applied. The driver blade 60 urges one staple downwardly, legs first, out of the magazine, through the sheets of paper and into the anvil where the legs are bent to join the papers together.

A band of staples 44 is loaded in the magazine 20 in a conventional manner and a pusher 70 is provided to urge the band of staples forward against the front vertical wall 26 to maintain the outermost staple in alignment with the driver blade 60 and the passageway 28. The pusher 70 is slideably mounted in the magazine and urged forward against the band of staples by a helical spring 72 held between the rear end of the pusher 70 and a front portion of the stapling arm 30. The portion of the device described thus far is conventional.

Figure 2:
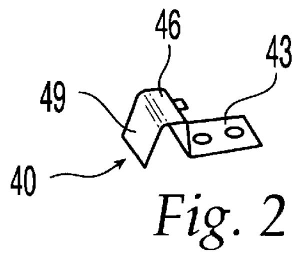
FIG. 2 is a perspective view of a support spring component for use in the stapler of FIG. 1.

According to the present invention, a support spring 40 is mounted adjacent to the passageway 28 within the top chamber of the magazine 20. The shape of the support spring 40 is delineated in more detail in FIG. 2. The support spring 40 has a base 43 for mounting to the base 22 of the open top chamber of the magazine 20. A top surface 46 of the spring 40 is parallel with and underlies the bridge portion of the staples before the staples are dispensed. The spring 40 has a width less than the spacing between the legs of the staples so that the staples can slide over the spring as they are moved toward the front end 26 of the cartridge 20.

The staples used in the preferred embodiment of the present invention have relatively long legs, namely, ⅜" long, to accommodate either thin or thick sets of paper sheets. These staples are preferably supplied in a band of 125 or 126 staples. The support spring 40 is further provided with a barb 45 for preventing use of the stapler with undersized staples. The barb is stamped out of the rear sloped surface 47 of the spring. It is located, height-wise, to be above any undersized staples. Therefore, if one were to load the stapler with undersized staples, the leading staple would be prevented from moving into an ejection position because its movement over the top surface 46 would be blocked by the barb 45.

A front sloped surface 49 of the support spring 40 is positioned in resilient spring contact with the front vertical wall 26 of the magazine 20 adjacent to the passageway 28. The top of the sloped surface 49, where it joins with the top surface 46, is spaced from the front wall 26 by a distance slightly greater than the thickness of an individual staple. The front surface 49 of the support spring 40 is used to prevent collapse of the staple bridge during the stapling operation.

Figure 5:
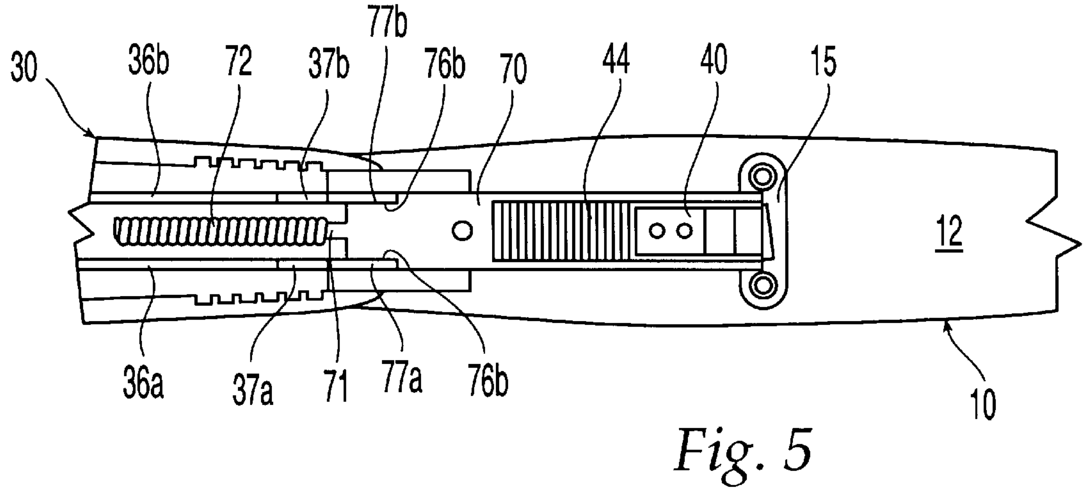
FIG. 5 is a top view of the stapler of FIG. 1 in an open position with the magazine positioned over the base to show the relationship of the pusher, staples and support spring.
Figure 7:
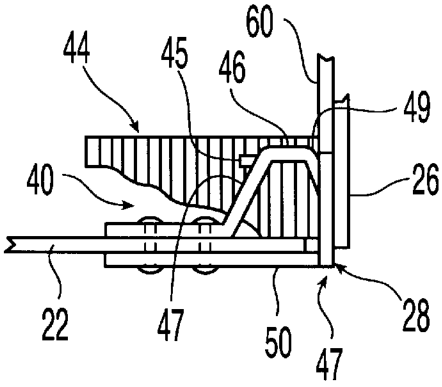
FIG. 7 is an expanded side view of the front end of the magazine to illustrate the relationship between the support spring, spacer, and staples during dispensing of the staple.

As best shown in FIG. 5, the band of staples 44 is urged into a stapling position over the support spring 40 and beneath the driver blade 60, which has a thickness substantially equal to the thickness of an individual staple. The driver blade 60 then contacts the forward most staple 47 and begins to push it out of the passageway 28 as the lever 35 is depressed. When the staple 47 is initially driven by the driver blade 60 into a large number of paper sheets, the legs of the staple 47 experience more resistance from the paper than from a smaller number of paper sheets. As shown in FIG. 7, the front sloped surface 46 of the spring 40 maintains continuous support of the bridge portion of staple 47 as it slides down along the sloped surface 36 of the spring 40 and eventually out of the magazine 20. The front sloped surface 46 of the spring moves rearwardly to allow the staple 47 to pass by and exit the magazine, after which is returns to its original position in contact with the front vertical wall of the magazine 20. By the time that the staple 47 has exited the magazine 20, the legs have already penetrated the paper and the bending operation in the anvil has almost been completed. This support of the staple 47 by the front sloped portion 46 of the spring 40 prevents bending or bowing of the bridge portion of the staple regardless of the number of sheets to be stapled.

Figure 6:
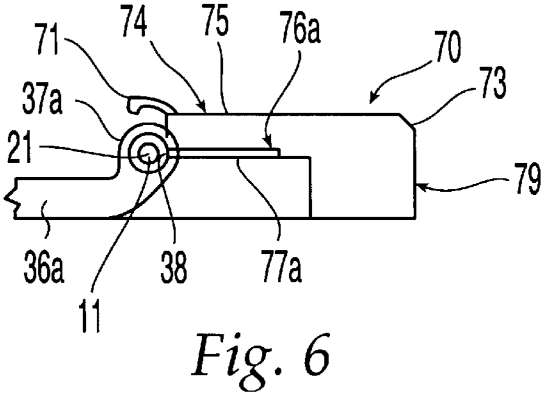
FIG. 6 is a side view of the operative relationship between the pusher and the rear end of the stapling arm.

Another feature of the invention is shown in FIG. 6. The pusher member 70 is illustrated in a completely retracted position with the stapling arm (not shown) in a horizontal, fully open position. This position is useful when a band of staples needs to be replaced in the magazine. The pusher member 70 has a front portion which is configured in the same manner as the band of staples, i.e., it has a front, U-shaped staple band pushing portion 79 which corresponds to the bridge and leg portions of the staples. The pusher member 70 includes a tapered front top portion 73 in the upper end of the band pushing portion 79 to avoid interference with the driver blade 60 as the individual staples are dispensed. The pusher member 70 also includes a rear portion 74 having a top 75 connected between a pair of sidewalls 76*a*, 76*b*, with wings 77*a*, 77*b* extending essentially perpendicularly from the sidewalls 76*a*, 76*b*. These wings fit into grooves in the upstanding side walls 24 of the magazine 20, so as to slidably retain the pusher in the magazine. The pusher member also includes a hook member 71 which engages a spring for urging the pusher member 70 forward toward the band of staples 44.

The stapling arm 30 has two end members 36*a*, 36*b*, which terminate in rings 37*a*, 37*b* as shown in FIGS. 5 and 6. When the stapling arm 30 is placed in a fully open position, as shown in FIG. 6, the wings 77*a*, 77*b* of the pusher member 70 engage recesses 38 in the rings 37*a*, 37*b* of the end members. This locks the stapling arm 30 and magazine 20 in the open position. This prevents accidental closure of the stapling arm and magazine due to the force of the spring 72, which accidental closure can injure the user's fingers if caught therebetween.

The interior of the magazine chamber has a length which is greater than the length of the band of staples to be loaded into the chamber. This provides room for manually moving the pusher forward, so as to unlock it, and thereby permit closing of the lever arm and magazine.

In an alternative embodiment, the locking of the stapler arm 30 can be eliminated. In this embodiment, the rings 37*a*, 37*b* of the two end members are constructed without grooves. Also, the stapler arm 30 and lever 35 can be mounted onto the base 10 of the stapler for pivoting movement to an open position in which the stapling arm and lever are not aligned with the base 10 of the stapler. Instead, appropriate stop means can be provided to limit the rotation of the stapler arm and lever to an open position which is about 120° from the base 10 of the stapler.

According to another aspect of the present invention, the hand held heavy duty stapler further comprises a spacer 50.

Figure 3:
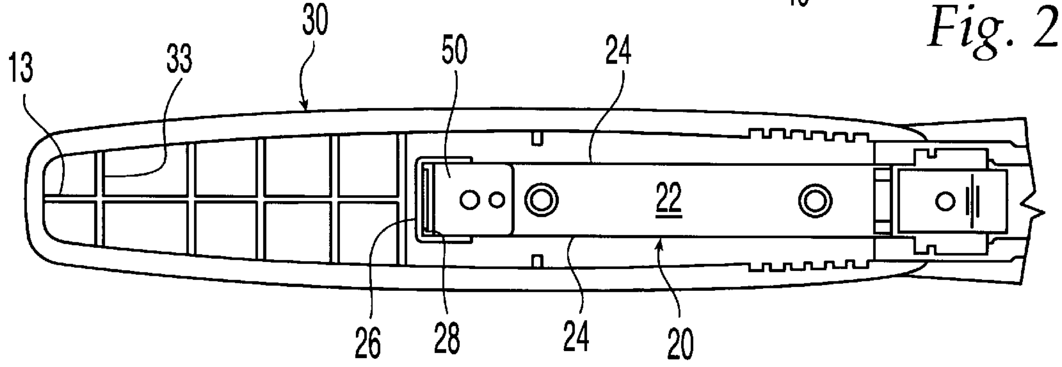
FIG. 3 is a top view of the stapler of FIG. 1 in a completely open position to illustrate the bottom portion of the lever.
Figure 4:
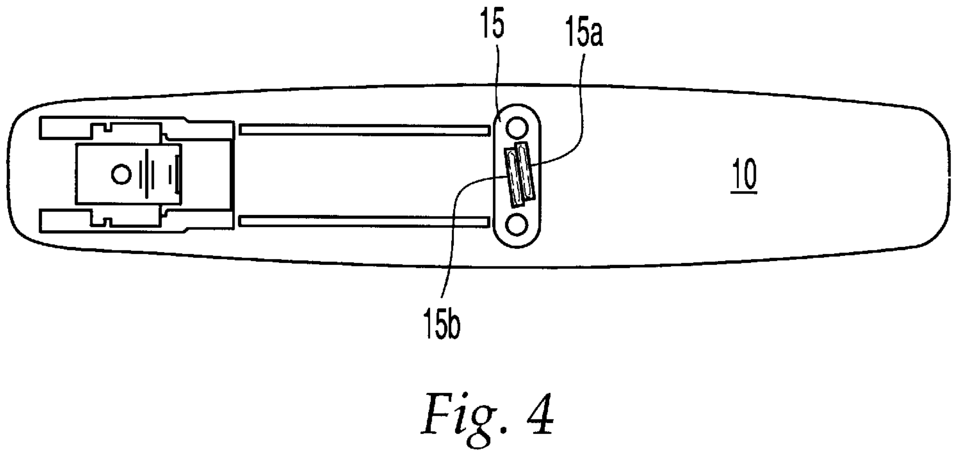
FIG. 4 is a top view of the stapler of FIG. 1 in a completely open position to illustrate the base and anvil.

This spacer, as shown in FIGS. 3 and 6, is attached to the bottom surface of the base 22 of the cartridge at its front end 26. It is positioned below the staple dispensing passageway 28 and spaced from the front end by a distance slightly greater than the thickness of an individual staple 47. The spacer compensates for the angle of the magazine 20 relative to the base 10 of the stapler and the anvil 15 as the magazine 20 is moved toward the base 10 and anvil 15. When the magazine 20 is driven downward against the anvil 15 for thin sets of paper sheets, the spacer 50 provides an additional thickness between the paper and magazine 20 so as to compensate for some of the angular movement of the magazine relative to the base. Therefore, the magazine is not required to be driven down further in order to complete the stapling operation. The spacer 50 also provides side support for the staple 47 at the very end of its movement into the paper sheets. This spacer 50 also assists in preventing the legs of the staple 47 from reentering through the set of paper after being clinched by the anvil when the stapler is used to fasten relatively thin sets of small numbers of sheets of paper. Finally, the spacer 50 limits the width of the passageway so that only one staple 47 at a time can be pressed down through the passageway 28.

The driver blade 60 is preferably constructed of sheet metal and is a substantially vertical blade-like element secured to the forward end of the stapling arm. The driver blade 60 is slidable in the guideway at the adjacent forward end of the magazine. When the stapling arm 30 is pressed downward by applying a downward force on the lever 35, rotation or pivoting of the stapling arm 30 carries the magazine 20. The downward movement of the magazine 20 is eventually arrested when the magazine engages the anvil 15 on the base 10 and continued movement of the stapling arm 30 relative to the now fixed magazine causes the driver blade to contact the outermost staple and drive the same through the passageway 28 as into operative engagement with the anvil 15. Release of the lever 35 causes the initial reverse rotation of the driver blade together with magazine and thereafter the continued rotation of the stapling arm alone.

To increase leverage during a stapling operation on a thick stack of paper, it is preferred in the present invention to use a stapling arm having a lever 35 with a lever front end 41 that is significantly longer than the magazine 20. The stapling arm 30 with the lever 35 and the base 10 of the hand held heavy duty stapler may have substantially equal lengths, but in another embodiment, these lengths are different. The forward end 39 of the base 22 and also the forward end 41 of the lever 35 are preferably each disposed at lengths from the pivot position 21, greater than the length from the pivot position to the passageway 28 of the magazine 20. This difference in lengths is preferably of an amount sufficient to provide a substantially increased leverage for driving staples during the stapling operation. Each of the lengths between the pivot position 21 and the forwards ends 41 and 31 of the lever 35 and base 22 are preferably at least about 30% longer than the length from the pivot position 21 to the passageway 28, more preferably at least about 50% longer, and most preferably at least about twice as long. In the preferred embodiment shown, the length of the base as well as the combined length of the stapling arm 30 and lever 35 are preferably typically at least 50% longer than the length of the magazine 20. It is more preferred that the length of the lever and base be about twice that of the magazine 20 to provide optimum leverage for stapling 50 or 60 sheets of paper.

Figure 11:
FIG. 11 is a side view of another embodiment of a stapler constructed according to the present invention.

FIG. 11 shows another embodiment of a stapler in which the forward ends 90 and 91 of the lever 92 and base 93 are disposed a lengths to the pivot position 94 that are about 50% longer than the length from the pivot position 94 to the staple dispensing passageway 95. This increased leverage facilitates the stapling through thick stacks, as the force required is reduced, even without a complex multiple linkage between the arm, magazine, and base.

The stapling lever 35 and base 10 of the stapler can be made of die cast metal or a thermoplastic so that they possess the necessary properties to be operable in the stapler. In addition, reinforcing ribs 33 can be provided beneath the lever 35 of the stapling arm as well as in the base 10 (not shown) to further strengthen these components.

To ensure that the stapler can be operated while being hand held by an adult operator adjacent the forward ends 39 and 41, the stapling arm 30 and lever 35 are mounted at an angle with respect to the base 10. As mentioned above, this angle is about 20° or less, preferably between 1 and 15° , and most preferably about 8° when the device is at rest or in a ready to use position. This angle enables the longer lengths of the base and lever of the stapling arm to be positioned sufficiently close to each other at the forward end 12 of the base and the lever 35, so that both components can be grasped by an adult user of the stapler. The relatively longer lever of the stapling arm and base allow the application of sufficient force by hand to provide staples in a set containing as many as 60 sheets of paper.

Figure 8:
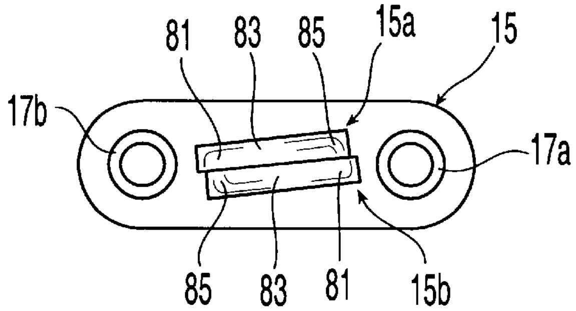
FIG. 8 is a top view of the anvil of FIG. 4.
Figure 9:
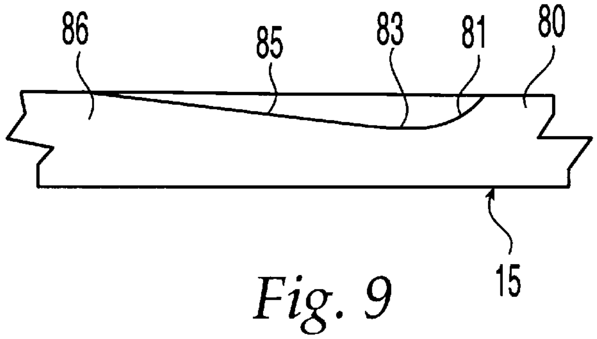
FIG. 9 is a side view of one of the grooves of the anvil of FIGS. 4 and 8.

According to yet another aspect of invention, the anvil 15 on the base 10 is specially designed to assist in providing proper staple finishing regardless of the number of sheets of paper to be joined. This anvil is best shown in FIGS. 8 and 9, and includes two similarly configured grooves 15*a*, 15*b*, which face in opposite directions and which are arranged adjacent each other. These grooves have a cross-section as shown in FIG. 9, with a relatively steep slope 81 at the end 80 which first receives the staple leg, followed by a flat bottom 83 and a shallow slope 85 which returns to the other end 86. A steep slope of about 45° and a shallow slope of about 5° are preferred. In an alternative embodiment, the flat bottom 83 can be eliminated and the slopes 81, 85 merged together in a smooth curve. As the staple leg enters the groove, it is initially bent by the steeply sloped portion 81 toward the other leg and then proceeds to be bent by the flat bottom portion 83 in a direction that is essentially parallel to the sheets. For a relatively large number of sheets to be stapled, this initial bending is sufficient to complete the joining of the sheets. When a relatively small number of sheets is to be joined, the staple continues through the groove and contacts the gradual slope 85 where it is further bent in a direction toward the sheets. The slope is very low so that the staple is not caused to repenetrate the sheets as in prior art devices. As explained above, spacer 50 assists in preventing the legs of the staple from penetrating through the sheets.

The grooves can be made by machining or grinding the desired profile in a metal blank, followed by polishing of the machined or ground profile to obtain smooth staple movement therethrough. Alternatively, these grooves can be stamped into the metal blank. These grooves are preferably oriented at an angle with regard to the driver blade 60 and staples to assist in avoiding interference between the legs as they are bent in the grooves. The grooves are oriented so that the legs are positioned in adjacent parallel relation after bending, in a substantially flat position beneath the joined sheets. The grooves are shown in a blank having two mounting 17*a*, 17*b* holes for attachment to the base 10. The specific shape and configuration of the blank is not critical and other shapes, such as round, oval, rectangular, square or other polygons can be used, if desired.

Figure 10:
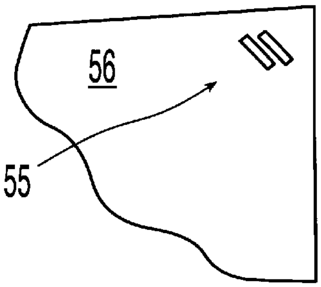
FIG. 10 is a partial view of the back of a set of sheets that have been stapled with the stapler of FIG. 1.

The resulting staple 55 in the bottom sheet 56 of a set of paper sheets is shown in FIG. 10, with the length of the legs being slightly longer or shorter depending upon the number of sheets to be joined. The invention is operable with anywhere between 2 and 60 sheets of conventional twenty pound paper. The maximum number of sheets will of course depend upon the thickness of the sheets. Another consideration is the relative hardness of the sheets, as the maximum number than can be joined will also depend on whether the sheets are softer (i.e., tissue paper) or harder (i.e., cardboard). One of ordinary skill in the art can readily determine the appropriate maximum number of sheets that can be properly joined by the present stapler.

It is understood that various other modifications will be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

What is claimed is:

1. A hand held stapler, comprising:

(a) a base including:
  (i) a pivot axis,
  (ii) a base forward end disposed at a first length from the pivot axis, and
  (iii) a staple leg clinching anvil;

(b) a magazine comprising an elongated channel configured and dimensioned for containing therein a band of staples and having a staple dispensing passageway therein configured to dispense of the staples driven therethrough against the anvil, the magazine being pivotally mounted about the pivot axis so that the magazine the and base can move toward each other during a stapling operation with the staple dispensing passageway disposed at a second length from the pivot axis; and (c) a stapling arm including:
  (i) a pivoted portion that is pivotally mounted about the pivot axis for driving the magazine toward the base for driving the staples through the staple dispensing passageway during the stapling operation, and
  (ii) a lever coupled with the pivoted portion and having a lever forward end facing the base forward end and extending past the staple dispensing passageway such that the lever forward end is disposed at a third length from the pivot axis, and each of the first and third lengths is substantially longer than the second length by an amount sufficient to provide a substantial leverage at the forward ends relative to the dispensing passageway for driving staples during the stapling operation.

2. The stapler of claim 1, wherein the first and third lengths are at least about 30% longer than the second length.

3. The stapler of claim 2, wherein the stapler is configured as a hand-held stapler with the lever and base mounted at an angle of less than about 20° with respect to each other for hand held operation while grasped and held by an adult operator adjacent the forward ends.

4. The stapler of claim 2, wherein the stapler is configured as a hand-held stapler, such that the lever and base are mounted sufficiently close together to enable an adult operator to grasp the stapler adjacent the forward ends for hand-held operation of the stapler.

5. The stapler of claim 1, wherein the first and third lengths are at least about 50% longer than the second length.

6. The stapler of claim 1, wherein the first and third lengths are at least about twice as long as the second length.

7. The stapler of claim 1, wherein the first and third lengths are substantially equal.

8. A hand held stapler, comprising:

a base having forward and rearward ends and a staple leg clinching anvil positioned thereon;

a magazine comprising an elongated channel for containing therein a band of staples, each staple having a pair of legs connected by a bridge portion, the channel having a bottom wall, a pair of sidewalls, a front vertical wall, and a staple dispensing passageway in the bottom wall adjacent the front vertical wall to allow dispensing of the staples, the magazine being pivotally mounted about a pivot axis at the rearward end of the base so that the magazine and base can move toward each other during a stapling operation;

a stapling arm having a forward end facing the base forward end and a pivoted portion that is pivotally mounted about the pivot axis at the rearward end of the base for driving the magazine toward the base during the stapling operation, the stapling arm including a driver blade for sequentially dispensing individual staples through the passageway from said band of staples contained in the magazine; and wherein the stapling arm includes a lever coupled with the pivoted portion and disposed such that the stapling arm with the lever extends from the rearward end of said base to the forward end thereof, and each of the base and the stapling arm with the lever is substantially longer than the magazine by an amount sufficient provide a substantial leverage at the forward ends relative to the dispensing passageway for driving staples during the stapling operation.

9. The stapler of claim 8, wherein each of the base and the stapling arm with the lever is at least about 50% longer than the magazine to provide leverage for driving staples during the stapling operation.

* * * * *